United States Patent

Matsumoto et al.

[11] Patent Number: 5,962,589
[45] Date of Patent: Oct. 5, 1999

[54] RUBBER COMPOSITIONS OF LOW COMPRESSION SET

[75] Inventors: Kazuhisa Matsumoto; Etsuo Minamino; Yoshiko Mori; Tsuyoshi Noguchi, all of Settsu, Japan

[73] Assignee: Daikin Industries, Ltd., Osaka, Japan

[21] Appl. No.: 08/849,104

[22] PCT Filed: Dec. 11, 1995

[86] PCT No.: PCT/JP95/02532

§ 371 Date: Jun. 9, 1997

§ 102(e) Date: Jun. 9, 1997

[87] PCT Pub. No.: WO96/17890

PCT Pub. Date: Jun. 13, 1996

[30] Foreign Application Priority Data

Dec. 9, 1994 [JP] Japan .................................. 6-331865

[51] Int. Cl.$^6$ .............................. C08L 27/24; C08L 33/10
[52] U.S. Cl. .................. 525/199; 525/326.2; 525/326.3; 525/330.3; 525/331.9; 525/355; 525/387
[58] Field of Search ................................ 525/199, 326.2, 525/326.3, 330.3, 387, 355, 331.9

[56] References Cited

U.S. PATENT DOCUMENTS

| | | | |
|---|---|---|---|
| 4,243,770 | 1/1981 | Tatemoto | 525/331 |
| 4,257,699 | 3/1981 | Lentz | 355/3 |
| 4,824,911 | 4/1989 | Chu | 525/199 |
| 4,925,907 | 5/1990 | Miyabayashi | 526/255 |
| 4,988,548 | 1/1991 | Takemura | 428/368 |
| 5,430,103 | 7/1995 | Ohata | 525/194 |

FOREIGN PATENT DOCUMENTS

| | | |
|---|---|---|
| 1-299859 | 4/1989 | Japan . |
| 1-297451 | 11/1989 | Japan . |
| 1-306455 | 12/1989 | Japan . |
| 2-064143 | 3/1990 | Japan . |
| 2-245046 | 9/1990 | Japan . |
| 7-026098 | 1/1995 | Japan . |
| 7-242785 | 9/1995 | Japan . |

*Primary Examiner*—Fred Zitomer
*Attorney, Agent, or Firm*—Kubovcik & Kubovcik

[57] ABSTRACT

A rubber composition of low compression set comprising 100 parts by weight of a mixture and 0.1 to 15 parts by weight of a peroxide crosslinking agent admixed therewith, the mixture comprising 5 to 55 wt. % of a peroxide-crosslinkable fluororubber containing vinylidene fluoride copolymerized therein in a proportion of 45 to 88 mole % and having a number average molecular weight of 20,000 to 200,000, and 95 to 45 wt. % of an acrylic rubber containing 0.1 to 1.5 wt. % of a polyfunctional monomer copolymerized therein and having a functional group rendering the acrylic rubber peroxide-cocrosslinkable with the fluororuber and a functional group effecting the copolymerization of the monomer with an acrylic ester, and molded product prepared from the composition.

21 Claims, No Drawings

5,962,589

RUBBER COMPOSITIONS OF LOW COMPRESSION SET

TECHNICAL FIELD

The present invention relates to rubber compositions, and more particularly to compositions which consist mainly of a fluororubber and an acrylic rubber and which are excellent in compression set and processability, and to products molded from the composition.

BACKGROUND ART

Acrylic rubbers have higher heat resistance and oil resistance than conventional general-purpose rubbers and are in use for various kinds of industrial seal materials. However, these rubbers are not fully satisfactory in compression set and heat resistance temperatures not lower than 170° C. and are unusable for seal materials at such temperatures.

On the other hand, fluororubbers are excellent in heat resistance, compression set, oil resistance and resistance to chemicals and are useful in the field of industrial materials and other fields. Nevertheless, it appears unlikely that these rubbers will be used in remarkably increased quantities in spite of their outstanding properties since economy is not negligible for prevalent use in these fields. Additionally, fluororubbers have the drawback of deteriorating markedly in the presence of additives contained in engine oils.

Investigations were conducted to develop materials having the characteristics of both acrylic rubbers and fluororubbers by blending a common acrylic rubber with a common fluororubber and vulcanizing the blend for molding with use of vulcanizers for one or both of the rubbers (JP-A-40558/1977, JP-A-146752/1978, JP-A- 101847/1979, JP-A-154446/1979, JP-A-156052/1979, JP-A- 23128/1980, JP-A-63740/1983, etc.), whereas the method failed to fully vulcanize one or both of the rubbers, giving products which were unsatisfactory in physical properties such as mechanical strength and compression set, heat resistance, and other properties. Although studies were also made on blends of acrylic rubbers and vinylidene fluoride resins (JP-A-39336/1988, JP-A- 20341/1988, JP-A-19486/1988, JP-A-8447/1988, JP-A- 236841/1987, JP-A-152133/1989 and JP-A-152016/1989), the products still remained to be improved in compression set because vinylidene fluoride resins can not be vulcanized and are crystalline.

In order to overcome these drawbacks, it was proposed to blend a fluororubber with an acrylic rubber intentionally partially crosslinked with a polyfunctional monomer having at least two, preferably three, functional groups, and vulcanize and mold the blend with a vulcanizer for the fluororubber (JP-A- 41379/1994, JP-A-287154/1993 and JP-A-287156/1993), but the disclosed techniques are effective only for compositions comprising a large amount of fluororubber and are not useful practically for compositions containing a large amount of the acrylic rubber i.e., a large amount of partially crosslinked component because of impaired processability such as lower flowability.

On the other hand, it is proposed to prepare a copolymer from an acrylic rubber and dihydrodicyclopentadienyloxyethyl acrylate or dihydrodicyclopentenyl acrylate which are greatly different in reactivity and co-crosslink the acrylic rubber and a fluororubber with a peroxide using the dihydrodicyclopentenyl group remaining in the polymer (JP-A-64143/1990). This method requires the use of two kinds of auxiliary crosslinking agents since difficulty is encountered in effecting crosslinking with an auxiliary crosslinking agent which is useful for both the acrylic rubber and the fluororubber. It is difficult in this case to fully crosslink both the rubbers, which therefore fail to provide a material of satisfactory compression set although the material is acceptable in processability.

A rubber composition is further proposed which comprises a rubber blend of a fluororubber having a reactive bromine group and/or an iodine group in the molecule and an acrylic rubber containing allyl acrylate copolymerized therein, and an organic peroxide and a trialkenyl trimellitic acid ester admixed with the blend (JP-A-245046/1990). The composition contains as much as 4.8 wt. % of allyl acrylate copolymer and is not processable substantially.

Accordingly, none of the compositions containing a large amount of acrylic rubber and heretofore available are satisfactory in all the properties of compression set, heat resistance and processability.

An object of the present invention is to provide a rubber composition having high processability for giving molded products which are excellent in compression set, physical properties such as mechanical strength and heat resistance, and molded products prepared from the composition.

DISCLOSURE OF THE INVENTION

The present invention provides a rubber composition of low compression set comprising 100 parts by weight of a mixture and 0.1 to 15 parts by weight of a peroxide crosslinking agent admixed therewith, the mixture comprising 5 to 55 wt. % of a peroxide-crosslinkable fluororubber containing vinylidene fluoride copolymerized therein in a proportion of 45 to 88 mole % and having a number average molecular weight of 20,000 to 200,000, and 95 to 45 wt. % of an acrylic rubber containing 0.1 to 1.5 wt. % of a polyfunctional monomer copolymerized therein and having a functional group rendering the acrylic rubber peroxide-cocrosslinkable with the fluororubber and a functional group effecting the copolymerization of the monomer with an acrylic ester, and molded products prepared from the composition.

According to the invention, examples of peroxide-crosslinkable fluororubbers are vinylidene fluoride copolymers such as vinylidene fluoride/hexafluoropropylene, vinylidene fluoride/tetrafluoroethylene/hexafluoropropylene, vinylidene fluoride/chlorotrifluoroethylene and vinylidene fluoride/tetrafluoroethylene/fluoro(alkyl vinyl ether) copolymers. Preferable among these are vinylidene fluoride/hexafluoropropylene and vinylidene fluoride/tetrafluoroethylene/hexafluoropropylene copolymers. The fluoro(alkyl vinyl ether) may contain a plurality of ether linkages. These fluororubbers are 20,000 to 200,000, preferably 20,000 to 100,000, more preferably 20,000 to 70,000, in molecular weight, i.e., in number average molecular weight. When to be used singly, fluororubbers are generally in excess of 200,000 in molecular weight to exhibit satisfactory characteristics. In contrast, the fluororubber to be compounded with the acrylic rubber for use in the invention fails to give satisfactory processability if exceeding 200,000 in molecular weight, while fully acceptable characteristics are unavailable after vulcanization if the molecular weight is lower than 20,000. The term processability means the viscosity of polymer at high temperatures, vulcanization characteristics and amenability to rolling process. The proportion of copolymerized vinylidene fluoride in the fluororubber is 45 to 88 mole %, preferably 55 to 65 mole % or 80 to 88 mole %, more preferably 63 to 55 mole % or 80 to 85 mole %.

When used singly, fluororubbers tend to lower in glass transition temperature with an increase in the proportion of copolymerized vinylidene fluoride. Fluororubbers also tend to exhibit higher compatibility with acrylic rubbers with an increase in this proportion. However, when compounded with acrylic rubber and if containing 65 to 80 mole % of copolymerized vinylidene fluoride, the fluororubber conversely tends to exhibit a higher glass transition temperature. Further the fluororubber containing 80 to 88 mole % of copolymerized vinylidene fluoride has poor rubber elasticity, is not usable singly as a rubber, but exhibits improved mechanical strength and higher compatibility with acrylic rubbers if compounded with acrylic rubbers. The fluororubber is then highly dispersible in alkyl (meth) acrylate polymers wherein the alkyl has at least 4 carbon atoms and which tend to exhibit lower compatibility with fluororubbers although having a low glass transition temperature. The fluororubber is low in compatibility with acrylic rubbers and encounters difficulty in giving higher dispersibility to polymers if less than 45 mole % in the proportion of copolymerized vinylidene fluoride. Impaired compression set will result if this proportion exceeds 88 mole %.

The fluororubbers of the invention include, for example, iodine-containing fluororubbers, which will be described below.

The preferred examples of iodine-containing fluororubbers include a readily curable fluororubber (see JP-A-125491/1978) which is obtained by polymerizing vinylidene fluoride (VdF) and at least one of monomers comprising a fluorine-containing ethylenically unsaturated compound having 2 to 8 carbon atoms (and when required, a fluorine-free ethylenically unsaturated compound having 2 to 4 carbon atoms) in the presence of a radical generator and an iodine compound represented by the formula RI x (wherein R is a saturated or unsaturated fluorohydrocarbon group having 1 to 16 carbon atoms, chlorofluorohydrocarbon group or hydrocarbon group having 1 to 3 carbon atoms, and x, which is the number of bonds of R, is an integer of not smaller than 1). Useful iodine-containing fluororubbers are copolymers containing 45 to 88 mole %, preferably 55 to 65 mole %, of vinylidene fluoride (VdF) unit, 0 to 55 mole %, preferably 15 to 25 mole %, of tetrafluoroethylene (TFE) unit and 10 to 40 mole %, preferably 15 to 25 mole %, of hexafluoropropylene (HFP) unit, and copolymers containing 45 to 88 mole %, preferably 80 to 88 mole %, of vinylidene fluoride (VdF) unit, 0 to 55 mole %, preferably 0 to 10 mole %, of tetrafluoroethylene (TFE) unit and 10 to 40 mole %, preferably 10 to 20 mole %, of hexafluoropropylene (HFP) unit.

According to the invention, the acrylic rubber can be prepared from a combination of (meth)acrylic ester monomer and polyfunctional monomer shown below by copolymerizing the monomers by a known polymerization process.

The (meth)acrylic ester monomer is represented by the formula $CH_2=C(R^1)COOR^2$ wherein $R^1$ is a hydrogen atom or methyl, and $R^2$ is alkyl or alkoxy-substituted alkyl having 1 to 8 carbon atoms. Examples of such monomers are methyl (meth)acrylate, ethyl (meth)acrylate, propyl (meth)acrylate, butyl (meth)acrylate, pentyl (meth)acrylate, hexyl (meth) acrylate, heptyl (meth)acrylate, octyl (meth)acrylate, 2-ethylhexyl (meth)acrylate, methoxyethyl (meth)acrylate and ethoxyethyl (meth)acrylate. Preferably $R^2$ has 2 to 4 carbon atoms. When the fluorine-containing polymer contains 55 to 65 mole % of vinylidene fluoride (VdF) unit, it is desired that the (meth)acrylic ester monomer contain at least 40 wt. % of a monomer with 2 carbon atoms. When the fluorine-containing polymer contains 80 to 88 mole % of vinylidene fluoride (VdF) unit, it is desired that the (meth) acrylic ester monomer contain at least 40 wt. % of a monomer with 4 carbon atoms. With an increase in the number of carbon atoms of $R^2$ and an increase in the proportion of the ester monomer to be copolymerized, the acrylic rubber exhibits more excellent low-temperature characteristics but lower oil resistance and lower compatibility with the fluororubber.

Examples of polyfunctional monomers are ethylene glycol di(meth)acrylate, 1,4-butanediol di(meth)acrylate, 1,6-hexanediol di(meth)acrylate, polyethylene glycol di(meth) acrylate, allyl (meth)acrylate, divinylbenzene, triallyl cyanurate and triallyl isocyanurate. Bifunctional monomers are desirable because use of such a monomer having three or more functional groups is likely to present difficulty in controlling the proportion of partially crosslinked component in the resulting copolymer. When the monomer has only one double bond in the molecule, no crosslinking group remains in the acrylic rubber, which therefore can not be cocrosslinked along with the fluororubber. More desirable among the bifunctional monomers are those wherein the two double bonds are different in reactivity in order to permit one of the double bonds to remain in the acrylic rubber as a crosslinking group. The bifunctional monomer must be fully crosslinkable with the same auxiliary crosslinking agent as is useful for the fluororubber, and dihydrodicyclopentenyl acrylate and ethylidene norbornane are unusable. Accordingly, allyl (meth)acrylate is more desirable.

The polyfunctional monomer is used in an amount of 0.1 to 1.5 wt. %, preferably 0.3 to 0.7 wt. %, based on the combined amount of acrylic ester monomer and polyfunctional monomer. If a smaller amount of polyfunctional monomer is used, the acrylic rubber will not be crosslinked sufficiently, presenting difficulty in vulcanization molding and resulting in low heat resistance and poor mechanical properties. An excess of polyfunctional monomer, if used, produces an increased amount of partially crosslinked component in the copolymer, leads to impaired processability and causes vulcanization to result in an excessively high crosslinking density, consequently giving a material which is no longer flexible, impaired in elongation and unusable for seals.

When required to obtain a modified polymer, the (meth) acrylic ester monomer to be polymerized may be partly replaced by an ethylenically unsaturated monomer such as acrylonirile, styrene, vinyl acetate, ethylene or vinyl chloride. The amount of substitution is preferably up to 40 wt. % of the (meth)acrylic ester monomer.

According to the invention, the ratio of the fluororubber to the acrylic rubber, i.e., flurororubber/acrylic rubber, is 5~55/95~45 by weight. When the proportion of copolymerized vinylidene fluoride in the fluororubber is 55 to 65 mole %, the ratio is preferably 5~35/95~65, more preferably 10~30/90~70. When the proportion of copolymerized vinylidene fluoride in the fluororubber is 80 to 88 mole %, the ratio is preferably 10~50/90~50, more preferably 30~50/70~50. If a lesser amount of fluororubber is used, the resulting material will not have sufficiently improved heat resistance and will be impaired in processability including flowability, whereas an excess of the fluororubber permits the material to deteriorate markedly due to the additive present in engine oil, etc. and is undesirable also economically.

Peroxide crosslinking agents useful for the invention are generally those which readily produce a peroxy radical when heated or in the presence of an oxidizing or reducing system. Examples of such agents are 1,1-bis(tert-butylperoxy)-3,5,5-trimethylcyclohexane, 2,5-dimethylhexane-2,5-dihydroxy peroxide, di-tert-butyl peroxide, tert-butylcumyl peroxide, dicumyl peroxide, α,α'-bis(tert-butylperoxy)-p-diisopropylbenzene, 2,5-dimethyl-2,5-di(tert-butylperoxy) hexane, 2,5-dimethyl-2,5-di(tert-butylperoxy)hexyne-3, benzoyl peroxide, tert-butylperoxybenzene, 2,5-dimethyl-2,5-di(benzoylperoxy)hexane, tert-butylperoxymaleic acid, tert-butylperoxyisopropyl carbonate, etc. Preferable among these are dialkyl compounds. The kind of agent and the amount thereof to be used are determined in view of the amount of active —O—O— and the decomposition temperature. The amount is usually 0.1 to 15 parts by weight, preferably 0.3 to 5 parts by weight, per 100 parts by weight of the polymers (combined amount of acrylic rubber and fluororubber).

When required, a suitable auxiliary crosslinking agent may be used conjointly. As a rule, useful auxiliary crosslinking agents are not limited particularly in type insofar as they are reactive on peroxy radicals and polymer radicals. Examples of desirable agents are triallyl cyanurate, triallyl isocyanurate, triacrylformal, triallyl trimellitate, dipropargyl terephthalate, diallyl phthalate, tetraallylterephthalamide, triallyl phosphate, etc. Although the auxiliary crosslinking agent need not always be used, the amount thereof to be used is preferably 0.1 to 10 parts by weight, more preferably 0.3 to 5 parts by weight, per 100 parts by weight of the polymers to be used.

According to the present invention, fillers, processing aids, antioxidants, age resistors, antiozonants, ultraviolet absorbers, etc. can be added to the composition when required.

Examples of useful fillers are magnesium oxide, calcium oxide, titanium oxide, silicon oxide, aluminum oxide and like metal oxides, magnesium hydroxide, aluminum hydroxide, calcium hydroxide and like metal hydroxides, magnesium carbonate, aluminum carbonate, calcium carbonate, barium carbonate and like carbonates, magnesium silicate, calcium silicate, sodium silicate, aluminum silicate and like silicates, aluminum sulfate, calcium sulfate, barium sulfate and like sulfates, synthetic hydrotalcite, molybdenum disulfide, iron sulfide, copper sulfide and like metal sulfides, kieselguhr, asbestos, lithopone (zinc sulfide/barium sulfate), graphite, carbon black, carbon fluoride, calcium fluoride, coke, etc.

Examples of processing agents are stearic acid, oleic acid, palmitic acid, lauric acid and like higher fatty acids, sodium stearate, zinc stearate and like higher fatty acid salts, stearic acid amide, oleic acid amide and like higher fatty acid amides, ethyl oleate and like higher fatty acid esters, stearylamine, oleylamine and like higher aliphatic amines, carnauba wax, ceresin wax and like petroleum wax, ethylene glycol, glycerin, diethylene glycol and like polyglycols, vaseline, paraffin and like aliphatic hydrocarbons, silicone oil, silicone polymers, low-molecular-weight polyethylene, phthalic acid esters, phosphoric acid esters, rosin, (halogenated) dialkylamines, (halogenated) dialkylsulfones, surfactants, etc.

Examples of antioxidants, age resistors and antiozonants are 2,5-di-tert-amylhydroquinoline and like phenolic compounds, 2,2,4-trimethyl-1,2-dihydroquinoline and like amine-ketone compounds, 4,4'-bis(α,α'-dimethylbenzyl) diphenylamine and like aromatic secondary amine compounds.

Examples of ultraviolet absorbers are 2,4-dihydroxybenzophenone and like benzophenone compounds, bis(2,2,6,6-tetramethyl-4-piperidyl)sebacate and like amine compounds, 2-(2'-hydroxy-5'-methylphenyl) benzotriazole and like benzotriazole compounds.

The composition of the invention is prepared usually by using a mixing device. For example, the fluororubber, acrylic rubber and other components or agents are kneaded by an open roll mill, treated in closed mixer, or mixed together in the form of an emulsion, followed by co-coagulation.

The composition of the invention has various uses. For example, it is suitable for packings, O-rings, hoses, other seals, diaphragms and valves which are resistant to oils, chemicals, heat, steam or weather for motor vehicles, ships, aircraft and like transport means, for similar packings, O-rings, seals, diaphragms, valves, hoses, rolls, tubes, coatings resistant to chemicals and linings for chemical plants, similar packings, O-rings, hoses, seals, belts, diaphragms, valves, rolls and tubes for food plant apparatus and food devices (including household utensils), similar packings, O-rings, hoses, seals, diaphragms, valves and tubes for atomic plant devices or apparatus, similar packings, O-rings, hoses, seals, diaphragms, valves, rolls, tubes, linings, mandrels, electric wires or cables, flexible joints, belts, rubber sheets and weather strips for general industrial parts, rolls blades for PPC copying machines, etc.

BEST MODE OF CARRYING OUT THE INVENTION

The invention will be described below in greater detail with reference to the following reference examples, examples and comparative examples.

REFERENCE EXAMPLES 1 TO 6 a) Preparating of Crosslinking Site Monomer

Allyl acrylate (hereinafter referred to briefly as "AA") was prepared by the following method.

A 46 g quantity of allyl alcohol and 89 g of triethylamine were placed into a 300-c.c. flask, 80 g of acrylic acid chloride was added dropwise to the contents at 0 to 5° C. over a period of 2 hours, and the mixture was thereafter reacted for 3 hours. The salt produced during the reaction was dissolved in pure water, and the reaction mixture was extracted with ether. The extract was washed with pure water several times and passed through a separating funnel. An ester was separated off, which was fractionated to obtain a purified ester.

"Viscoat #195," brand name of Osaka Yukikagaku Kogyo Co., Ltd., was used as it was as 1,4-butanediol diacrylate (hereafter abbreviated as "14BGA"), and "Acrylic ester A," brand name of Mitsubishi Rayon Co., Ltd., as allyl methacrylate (hereinafter abbreviated as "AMA"). "FA-511A," brand name of Hitachi Chemical Co., Ltd., was used as it was as dihydrodicyclopentenyl acrylate (hereinafter abbreviated as "DDA").

b) Polymerization of Acrylic Rubber

Into a separable flask equipped with a thermometer, stirrer, nitrogen supply tube and evacuating device were placed 480 parts of water, 0.24 part of sodium bicarbonate, 0.48 part of sodium laurylsulfate, 0.48 parts of Nonipole 200 (polyoxyethylene nonylphenyl ether) and 100 parts of monomer mixture of Table 1, the oxygen within the system was thorougly removed by repeating evacuation and nitrogen replacement, and 0.01 part of sodium hydrosulfite, 0.002 part of sodium formaldehyde sulfoxylate and 0.005 part of tert-butyl hydroperoxide were thereafter placed in to start a plymerization reaction at 50° C. The reaction was continued for 6 hours so as to achieve a polymerization conversion within the range of 95 to 99%, followed by salting-out of the reaction mixture, sufficient washing with water and drying to obtain an acrylic rubber. Incidentally, EA stands for ethyl acrylate, and BA for butyl acrylate.

TABLE 1

| Acrylic rubber amount (wt. %) | A-1 | A-2 | A-3 | A-4 | A-5 |
|---|---|---|---|---|---|
| EA | 99.9 | 99.5 | 99.0 | 99.5 | 49.75 |
| BA | | | | | 49.75 |
| AA | 0.1 | 0.5 | 1.0 | | |
| 14BCA | | | | 0.5 | |
| AMA | | | | | 0.5 |
| DDA | | | | | |

| Acrylic rubber amount (wr. %) | A-6 | A-7 | A-8 | A-9 | A-10 |
|---|---|---|---|---|---|
| EA | 99.99 | 98.0 | 95.24 | 98.0 | 29.9 |
| BA | | | | | 69.8 |
| AA | 0.01 | 2.0 | 4.76 | | |
| 14BGA | | | | | |
| AMA | | | | | 0.3 |
| DDA | | | | 2.0 | | c) Polymerization of Fluororubber

Into a polymerization reactor made of SUS and having a capacity of 3 liters were placed 1 liter of pure water and 2 g of $C_7F_{15}COONH_4$ serving as an emulsifier, the interior of the system was fully replaced by nitrogen gas, and an initial monomer mixture of VdF/HFP/TFE was forced into the reactor at 80° C. to an internal pressure of 16 kg/cm$^2$ G. Subsequently, 10 ml of a 0.2 wt. % aqueous solution of ammonium persulfate was forced in to start a reaction.

Since the pressure dropped with the progress of the polymerization reaction, $I(CF_2)_4I$ serving as a molecular weight adjusting agent was forced in upon a pressure drop to 15 kg/cm$^2$ G. When the pressure further dropped to 14 kg/cm$^2$ G, the system was repressurized with a continuous monomer mixture of VdF/HFP/TFE to a pressure of 16 kg/cm$^2$ G. The aqueous solution of ammonium persulfate was forced into the system with nitrogen gas every 3 hours in an amount of 10 ml each time to continue the reaction with repeated decrease and increase in the pressure to obtain an aqueous emulsion.

To the emulsion was added a 5 wt. % aqueous solution of potash alum for coagulation, and the coagulated product was washed with water and dried to obtain a rubberlike polymer. The initial monomer mixture, the amount of $I(CF_2)_4I$, subsequent monomer mixture, reaction time and yield are listed in Table 1, in which 2F stands for VdF (vinylidene fluoride), 4F for TFE (tetrafluoroethylene) and 6F for HFP (hexafluoropropylene).

TABLE 2

| | | F-1 | F-2 | F-3 | F-4 |
|---|---|---|---|---|---|
| initial monomer mixture (mol. %) | 2F | 33 | 33 | 33 | 33 |
| | 4F | 11 | 11 | 11 | 11 |
| | 6F | 56 | 56 | 56 | 56 |
| $I(CF_2)_4I$ (g) | | 9.1 | 3.0 | 1.8 | 0.9 |
| continuous monomer mixture (mol. %) | 2F | 60 | 60 | 60 | 60 |
| | 4F | 20 | 20 | 20 | 20 |
| | 6F | 20 | 20 | 20 | 20 |
| reaction time (hr) | | 8.5 | 6 | 8 | 12 |
| yield (g) | | 199 | 202 | 205 | 181 |

TABLE 2-continued

| | | F-5 | F-6 | F-7 | F-8 |
|---|---|---|---|---|---|
| initial monomer mixture (mol. %) | 2F | 50 | 7 | 65 | 71 |
| | 4F | 0 | 18 | 0 | 0 |
| | 6F | 50 | 75 | 38 | 29 |
| $I(CF_2)_4I$ (g) | | 0.9 | 0.9 | 1.8 | 1.8 |
| continuous monomer mixture (mol. %) | 2F | 82 | 30 | 85 | 90 |
| | 4F | 0 | 40 | 0 | 0 |
| | 6F | 18 | 30 | 15 | 10 |
| reaction time (hr) | | 10 | 6 | 12 | 13 |
| yield (g) | | 208 | 191 | 195 | 194 |

The number average molecular weight of the copolymer was determined by the following method.

[Conditions for Determining Molecular Weight]

Gel permeation chromatograph: High performance GPC device, HLC-8020 (product of Toso Co., Ltd.)

Columns: TSK guard column Hhr-H (one),

TSK gel-G5000H, -G4000H, -G3000H, -G2000H (one each) (products of Toso Co., Ltd.)

Sensor: RI sensor (differential reflectometer) incorporated in HLC-8020

Data analysis: Supersystem Controller SC-8020 (product of Toso Co., Ltd.)

Developer solvent: Tetrahydrofuran

Temperature: 35° C.

Concentration: 0.5 wt. %

Standard polymers for molecular weight calibration curve: Monodisperse polystyrenes, TSK standard POLYSTYREN [Mw/Mn=1.14 (max)] (product of Toso Co., Ltd.)

The composition of the copolymer was determined by 19F NMR measurement.

Mooney viscosity was measured according to JIS K-6300.

TABLE 3

| fluororubber amount (mole %) | F-1 | F-2 | F-3 | F-4 |
|---|---|---|---|---|
| 2F | 62 | 63 | 61 | 60 |
| 4F | 20 | 19 | 18 | 22 |
| 6F | 18 | 18 | 21 | 18 |
| molecular weight number average molecular weight (× 10000) | 1.0 | 3.4 | 5.2 | 10.0 |
| $M_{L\ 1+10}$ 100° C. | 2 | 6 | 13 | 89 |

| fluororubber amount (mole %) | F-5 | F-6 | F-7 | F-8 |
|---|---|---|---|---|
| 2F | 82 | 30 | 85 | 90 |
| 4F | 0 | 40 | 0 | 0 |
| 6F | 18 | 30 | 15 | 10 |
| molecular weight number average molecular weight (× 10000) | 10.2 | 10.1 | 5.5 | 5.7 |
| $M_{L\ 1+10}$ 100° C. | 75 | 40 | 18 | 19 |

EXAMPLES 1 TO 12

Compositions for crosslinking were prepared each by kneading a fluororubber, acrylic rubber and other components in the amounts specified in Table 4 by an open roll mill. Each composition was vulcanized on a press at 160° C. for 20 minutes and further vulcanized in an oven at 180° C. for 4 hours. Seast 116 is carbon black of the MAF type manufactured by Tokai Carbon Co., Ltd., TAIC is triallyl isocyanurate manufactured by Nihon Kasei Co., Ltd., Perhexa 25B is a peroxide manufactured by Nippon Oils & Fats Co., Ltd., and Naugard 445 is an age resistor manufactured by Uniroyal Chemical Co., Ltd. The properties of the resulting materials were determined according to JIS K-6301. Table 5 shows the result.

TABLE 4

| Example | 1 | 2 | 3 | 4 | 5 | 6 |
|---|---|---|---|---|---|---|
| amount (weight part) | | | | | | |
| F-2 | | | | | | |
| F-3 | 30 | | | | | |
| F-4 | | 30 | 30 | 50 | 10 | 30 |
| F-5 | | | | | | |
| F-7 | | | | | | |
| A-1 | 70 | | | | | |
| A-2 | | 70 | 70 | 50 | 90 | |
| A-3 | | | | | | 70 |
| A-4 | | | | | | |
| A-5 | | | | | | |
| A-10 | | | | | | |
| amount (weight part) | | | | | | |
| Polymer | 100 | 100 | 100 | 100 | 100 | 100 |
| Stearic acid | 1 | 1 | 1 | 1 | 1 | 1 |
| Seast 116 | 35 | 35 | 35 | 25 | 45 | 35 |
| TAIC | 4 | 4 | 0 | 4 | 4 | 4 |
| Perhexa 25B | 1.5 | 1.5 | 1.5 | 1.5 | 1.5 | 1.5 |
| Naugard 445 | 1 | 1 | 1 | 1 | 1 | 1 |

| Example | 7 | 8 | 9 | 10 | 11 | 12 |
|---|---|---|---|---|---|---|
| amount (weight part) | | | | | | |
| F-2 | | | 30 | | | |
| F-3 | | 30 | | | | |
| F-4 | 30 | | | 30 | | |
| F-5 | | | | | 30 | |
| F-7 | | | | | | 50 |
| A-1 | | | | | | |
| A-2 | | | | | | |
| A-3 | | | | | | |
| A-4 | 70 | 70 | | | | |
| A-5 | | | 70 | 70 | | |
| A-10 | | | | | 70 | 50 |
| amount (weight part) | | | | | | |
| polymer | 100 | 100 | 100 | 100 | 100 | 100 |
| Stearic acid | 1 | 1 | 1 | 1 | 1 | 1 |
| Seast 116 | 35 | 30 | 30 | 30 | 35 | 35 |
| TAIC | 4 | 4 | 4 | 4 | 4 | 4 |
| Perhexa 25B | 1.5 | 1.5 | 1.5 | 1.5 | 1.5 | 1.5 |
| Naugard 445 | 1 | 1 | 1 | 1 | 1 | 1 |

TABLE 5

| Example | 1 | 2 | 3 | 4 | 5 | 6 |
|---|---|---|---|---|---|---|
| Processability (160° C.) | | | | | | |
| Curelast ML | 0.6 | 0.8 | 0.7 | 0.6 | 0.9 | 0.9 |
| Curelast T10 | 0.9 | 0.7 | 0.3 | 0.6 | 0.3 | 0.6 |
| Physical properties in original state | | | | | | |
| 100% Modulus | 28 | 70 | 18 | 54 | 79 | 125 |
| Tensile strength | 102 | 136 | 81 | 149 | 132 | 126 |
| Elongation | 320 | 190 | 470 | 250 | 170 | 101 |
| Hardness | 64 | 72 | 61 | 69 | 75 | 76 |
| Compression set test (175° C. × 72 hr) | | | | | | |
| set | 17.4 | 14.2 | 15.5 | 14.8 | 16.1 | 13.1 |

TABLE 5-continued

| Heat aging test in air (175° C. × 200 hr) | | | | | | |
|---|---|---|---|---|---|---|
| Variation in tensile strength | −14 | −6 | −19 | −6 | −5 | −11 |
| Variation in elongation | −9 | 0 | +11 | 0 | 0 | 0 |
| Variation in hardness | +10 | +6 | +5 | +5 | +7 | +6 |
| German torsional test (solvent isopropyl alcohol) | | | | | | |
| T10 (° C.) | −9.5 | −9.5 | −9.6 | −10.0 | −11.3 | −9.6 |

| Example | 7 | 8 | 9 | 10 | 11 | 12 |
|---|---|---|---|---|---|---|
| Processability (160° C.) | | | | | | |
| Curelast ML | 1.0 | 0.3 | 0.4 | 0.4 | 0.7 | 0.7 |
| Curelast T10 | 0.4 | 1.4 | 1.1 | 1.3 | 0.6 | 0.7 |
| Physical properties in original state | | | | | | |
| 100% Modulus | 87 | 36 | 33 | 35 | 22 | 22 |
| Tensile strength | 132 | 84 | 94 | 87 | 103 | 110 |
| Elongation | 150 | 200 | 230 | 210 | 340 | 410 |
| Hardness | 73 | 66 | 64 | 66 | 63 | 71 |
| Compression set test (175° C. × 72 hr) | | | | | | |
| set | 14.0 | 20.7 | 21.5 | 19.5 | 21.0 | 21.4 |
| Heat aging resistance test (175° C. × 200 hr) | | | | | | |
| Variation in tensile strength | +6 | −2 | 0 | +5 | −6 | +4 |
| Variation in elongation | 0 | −6 | −4 | −5 | −9 | −2 |
| Variation in hardness | +5 | +6 | +6 | +6 | +4 | +4 |
| German torsional test (solvent isopropyl alcohol) | | | | | | |
| T10 (° C.) | −9.6 | −14.5 | −16.0 | −14.3 | −15.3 | −16.5 |

COMPARATIVE EXAMPLES 1 TO 9

Compositions were prepared each in the same manner as in Examples except that a fluororubber, acrylic rubber and other components were kneaded in the amounts specified in Table 6. Sumifine BM is N,N'-m- phenylenebismaleimide manufactured by Sumitomo Chemical Co., Ltd., and Perbutyl P is a peroxide manufactured by Nippon Oils & Fats Co., Ltd. The properties of the materials obtained were determined according to JIS K- 6301. Table 7 shows the result. It was impossible to check the specimens of Comparative Examples 1 and 3 for compression set owing to cracking. The specimen of Comparative Example 4 was low in flowability, failing to afford any sheet.

TABLE 6

| | Comparative Example | | | | |
|---|---|---|---|---|---|
| amount (weight part) | 1 | 2 | 3 | 4 | 5 |
| F-1 | | | | | |
| F-4 | | 30 | 30 | 30 | 30 |
| F-6 | | | | | |
| F-8 | | | | | |
| A-2 | 100 | | | | |
| A-5 | | | | | |
| A-6 | | 70 | | | |

TABLE 6-continued

| | | | | | |
|---|---|---|---|---|---|
| A-7 | | | 70 | | |
| A-8 | | | | 70 | |
| A-9 | | | | | 70 |
| A-10 | | | | | |
| Polymer | 100 | 100 | 100 | 100 | 100 |
| Stearic acid | 1 | 1 | 1 | 1 | 1 |
| Seast 116 | 50 | 35 | 35 | 35 | 35 |
| TAIC | 4 | 4 | 4 | 3 | 4 |
| Sumifine BM | | | | | 1.05 |
| Perhexa 25B | 1.5 | 1.5 | 1.5 | 1.5 | |
| Perbutyl P | | | | | 1 |
| Naugard 445 | 1 | 1 | 1 | 1 | 1 |

| | Comparative Example | | | |
|---|---|---|---|---|
| amount (weight part) | 6 | 7 | 8 | 9 |
| F-1 | | 30 | | |
| F-4 | 70 | | | |
| F-6 | | | 30 | |
| F-8 | | | | 50 |
| A-2 | 30 | | | |
| A-5 | | 70 | 70 | |
| A-6 | | | | |
| A-7 | | | | |
| A-8 | | | | |
| A-9 | | | | |
| A-10 | | | | 50 |
| Polymer | 100 | 100 | 100 | 100 |
| Stearic acid | 1 | 1 | 1 | 1 |
| Seast 116 | 15 | 35 | 35 | 30 |
| TAIC | 4 | 4 | 4 | 4 |
| Sumifine BM | | | | |
| Perhexa 25B | 1.5 | 1.5 | 1.5 | 1.5 |
| Perbutyl P | | | | |
| Naugard 445 | 1 | 1 | 1 | 1 |

TABLE 7

| Comparative Example | 1 | 2 | 3 | 4 | 5 |
|---|---|---|---|---|---|
| Processability (160° C.) | | | | | |
| Curelast ML | 0.7 | 0.1 | 1.3 | 1.4 | 0.4 |
| Curelast T10 | 0.1 | 1.5 | 0.6 | 0.7 | 0.8 |
| Physical properties in original state | | | | | |
| 100% Modulus | 92 | 18 | — | unmoldable | 28 |
| Tensile strength | 120 | 45 | 70 | unmoldable | 100 |
| Elongation | 140 | 580 | 40 | unmoldable | 380 |
| Hardness | 77 | 55 | 83 | unmoldable | 66 |
| Compression set test (175° C. × 72 hr) | | | | | |
| set | crack | 55.0 | crack | unmoldable | 31.1 |
| Heat aging test in air (175° C. × 200 hr) | | | | | |
| Variation in tensile strength | −4 | +20 | +23 | unmoldable | +10 |
| Variation in elongation | 0 | −23 | +13 | unmoldable | −24 |
| Variation in hardness | +7 | +4 | +3 | unmoldable | +10 |
| German torsional tes (solvent isopropyl alcohol) | | | | | |
| T10 (° C.) | −13.0 | −9.5 | −9.5 | — | −9.0 |

| Comparative Example | 6 | 7 | 8 | 9 |
|---|---|---|---|---|
| Processability (160° C.) | | | | |
| Curelast ML | 0.3 | 0.2 | 0.4 | 0.8 |
| Curelast T10 | 0.7 | 1.3 | 1.1 | 1.5 |

TABLE 7-continued

| | | | | |
|---|---|---|---|---|
| Physical properties in original state | | | | |
| 100% Modulus | 35 | 35 | 27 | — |
| Tensile strength | 141 | 68 | 75 | 91 |
| Elongation | 310 | 170 | 190 | 90 |
| Hardness | 69 | 68 | 66 | 83 |
| Compression set test (175° C. × 72 hr) | | | | |
| set | 23.5 | 35.8 | 22.0 | 31.5 |
| Heat aging test in air (175° C. × 200 hr) | | | | |
| Variation in tensile strength | 7 | +23 | 0 | +15 |
| Variation in elongation | −4 | −6 | −4 | −13 |
| Variation in hardness | +4 | +6 | +6 | +8 |
| German torsional tes (solvent isopropyl alcohol) | | | | |
| T10 (° C.) | −8.5 | −11.2 | −10.0 | −11.5 |

COMPARATIVE EXAMPLE 10

A composition comprising the components listed in Table 8 below was crosslinked under the vulcanization conditions given in the Table.

Dai-el G602 is a vinylidene fluoride copolymer fluororubber which is not crosslinkable with a peroxide.

TABLE 8

| | Comparative Example 10 |
|---|---|
| amount | |
| Polymer (Dai-el G602) | 100 |
| MT Carbon | 20 |
| Ca (OH)$_2$ | 6 |
| MgO | 3 |
| vulcanization | |
| primary vulcanization | 170° C., 10 min |
| secondary vulcanization | 230° C. 24 hr |

TEST EXAMPLE 1

Dumbbell specimens were cut out from each of sheets obtained by vulcanizing the compositions of Examples 2, 4 and 5, and Comparative Examples 6 and 10, and then immersed in an engine oil. The engine oil used was Toyota Genuin Castle (SG grade). The specimens were held immersed at 170° C. for 70 hours, thereafter withdrawn from the oil, cooled at room temperature and checked for variations in volume, breaking strength and breaking elongation due to the immersion. It is seen that the presence of an excess of fluororubber results in marked deterioration due to the engine oil. In Table 9, ΔV stands for volume swell (%), ΔT b for breaking strength variation (%) and ΔE b for breaking elongation variation (%).

TABLE 9

|  | Example | | | Comparative Example | |
| --- | --- | --- | --- | --- | --- |
|  | 2 | 4 | 5 | 6 | 10 |
| F-4 | 30 | 50 | 10 | 70 | 100 |
| A-2 | 70 | 50 | 90 | 30 | 0 |
| ΔV | +3.9 | +3.1 | +4.7 | +2.5 | +1.4 |
| ΔTb | +7 | +3 | ±0 | −47 | −69 |
| ΔEb | −12 | −22 | −5 | −36 | −44 |

INDUSTRIAL APPLICABILITY

The use of the rubber composition of the invention provides molded products which are low in compression set and excellent in mechanical strength and other physical properties, and heat resistance.

We claim:

1. A rubber composition of low compression set comprising 100 parts by weight of a mixture and 0.1 to 15 parts by weight of a peroxide crosslinking agent admixed therewith, the mixture comprising 5 to 55 wt. % of a peroxide-crosslinkable fluororubber containing vinylidene fluoride copolymerized therein in a proportion of 45 to 88 mole % and having a number average molecular weight of 20,000 to 200,000, and 95 to 45 wt. % of an acrylic rubber containing 0.1 to 1.5 wt. % of a polyfunctional monomer copolymerized therein and having a functional group rendering the acrylic rubber peroxide-cocrosslinkable with the fluororuber and a functional group effecting the copolymerization of the monomer with an acrylic ester.

2. A rubber composition as defined in claim 1 wherein the fluororubber is an iodine-containing fluororubber.

3. A rubber composition as defined in claim 1 wherein the fluororubber is a copolymer which is obtained by polymerizing 45 to 88 mole % of vinylidene fluoride unit, 0 to 55 mole % of tetrafluoroethylene unit and 10 to 40 mole % of hexafluoropropylene unit in the presence of an iodine compound represented by the formula $RI_x$ (wherein R is a saturated or unsaturated fluorohydrocarbon group having 1 to 16 carbon atoms, chlorofluorohydrocarbon group having 1 to 16 carbon atoms or hydrocarbon group having 1 to 3 carbon atoms, and x, which is the number of bonds of R, is an integer of 1 or more), has 0.01 to 1 wt. % of iodine derived from RI x based on the copolymer weight and has a number average molecular weight of 20,000 to 100,000.

4. A rubber composition as defined in claim 1 wherein the copolymer is 45 to 75 mole % in the proportion of copolymerized vinylidene fluoride.

5. A rubber composition as defined in claim 4 wherein the copolymer is 55 to 65 mole % in the proportion of copolymerized vinylidene fluoride.

6. A rubber composition as defined in claim 4 wherein the fluororubber has a number average molecular weight of 20,000 to 70,000.

7. A rubber composition as defined in claim 4 wherein the copolymer is obtained by polymerizing 55 to 65 mole % of vinylidene fluoride unit, 15 to 25 mole % of tetrafluoroethylene unit and 15 to 25 mole % of hexafluoropropylene unit.

8. A rubber composition as defined in claim 4 wherein the acrylic rubber is a copolymer comprising 99.9 to 98.5 wt. % of alkyl (meth)acrylate unit ($C_2$ to $C_4$ alkyl) and 0.1 to 1.5 wt. % of a polyfunctional monomer unit.

9. A rubber composition as defined in claim 4 wherein the polyfunctional monomer is allyl (meth)acrylate.

10. A rubber composition as defined in claim 4 wherein the acrylic rubber is at least 40 wt. % in the proportion of copolymerized ethyl acrylate.

11. A rubber composition as defined in claim 4 which comprises 10 to 30 wt. % of the fluororubber and 90 to 70 wt. % of the acrylic rubber.

12. A rubber composition as defined in claim 1 wherein the copolymer is 80 to 88 mole % in the proportion of copolymerized vinylidene fluoride.

13. A rubber composition as defined in claim 12 wherein the fluororubber has a number average molecular weight of 20,000 to 70,000.

14. A rubber composition as defined in claim 12 wherein the copolymer is obtained by polymerizing 80 to 88 mole % of vinylidene fluoride unit, 0 to 10 mole % of tetrafluoroethylene unit and 10 to 20 mole % of hexafluoropropylene unit.

15. A rubber composition as defined in claim 12 wherein the acrylic rubber is a copolymer comprising 99.9 to 98.5 wt. % of alkyl (meth)acrylate unit ($C_2$ to $C_4$ alkyl) and 0.1 to 1.5 wt. % of a polyfunctional monomer unit.

16. A rubber composition as defined in claim 4 wherein the polyfunctional monomer is allyl (meth)acrylate.

17. A rubber composition as defined in claim 4 wherein the acrylic rubber is at least 40 wt. % in the proportion of copolymerized butyl acrylate.

18. A rubber composition as defined in claim 12 which comprises 10 to 50 wt. % of the fluororubber and 90 to 50 wt. % of the acrylic rubber.

19. A molded rubber product obtained by crosslinking a composition of claim 1 with a peroxide.

20. A molded rubber product obtained by crosslinking a composition of claim 4 with a peroxide.

21. A molded rubber product obtained by crosslinking a composition of claim 12 with a peroxide.

* * * * *